United States Patent [19]

Kassai

[11] 4,264,080
[45] Apr. 28, 1981

[54] TOY VEHICLE FOR CHILDREN

[75] Inventor: Kenzou Kassai, Osaka, Japan

[73] Assignee: Kassai Kabushikikaisha, Osaka, Japan

[21] Appl. No.: 45,862

[22] Filed: Jun. 6, 1979

[30] Foreign Application Priority Data

| Aug. 2, 1978 | [JP] | Japan | 53-107027[U] |
| Nov. 14, 1978 | [JP] | Japan | 53-157197[U] |
| Mar. 1, 1979 | [JP] | Japan | 54-27395[U] |
| Mar. 7, 1979 | [JP] | Japan | 54-29594[U] |

[51] Int. Cl.³ .............................................. A63G 19/18
[52] U.S. Cl. ................................. 280/1.13; 46/111; 46/201
[58] Field of Search .................. 280/1.13, 1.14, 1.188, 280/1.201, 1.22, 1.1 R, 1.11 R, 87.02 R; 46/221, 222, 223, 112, 201, 98, 111; D21/73, 74, 76, 78, 79; 296/177; 292/127

[56] References Cited

U.S. PATENT DOCUMENTS

| D.252,653 | 8/1979 | Nakao et al. | D21/78 |
| 1,319,321 | 10/1919 | Bennett | 280/1.11 R |
| 1,447,953 | 3/1923 | Herschmann | 280/1.14 |
| 3,044,287 | 7/1962 | Pelcin | 292/127 X |
| 3,791,662 | 2/1974 | Glass | 280/1.1 R |
| 3,902,739 | 9/1975 | Kimura | 280/1.11 R |
| 4,105,347 | 8/1978 | Gossage | 403/324 X |
| 4,114,312 | 9/1978 | Hendry | 46/223 |

FOREIGN PATENT DOCUMENTS 945178 12/1963 United Kingdom ..................... 46/221

OTHER PUBLICATIONS

Model Rocketry Catalog, No. 701, Estes Industries, Inc., 1970, pp. 120, 121.

*Primary Examiner*—John A. Pekar
*Attorney, Agent, or Firm*—W. G. Fasse; D. F. Gould

[57] ABSTRACT

A vehicle for children is constructed so that a child sits on it with the legs on either side and drives it with leg strokes kicking the ground. A bonnet-like portion forming the front top of the body of the vehicle is tiltably attached to the front of the body excluding the portion. Thus, the tilting of the bonnet-like portion enables the portion to assume a closed position and an open position. The outer surface of the bonnet-like portion indicates a caricature of a human facial expression with the eyes opened, while the outer surface of the portion of the body remainder located below the bonnet-like portion indicates a human facial expression with the eyes closed. As a result, the appearance of the front of the vehicle for children will vary between the closed and open positions of the bonnet-like portion.

17 Claims, 25 Drawing Figures

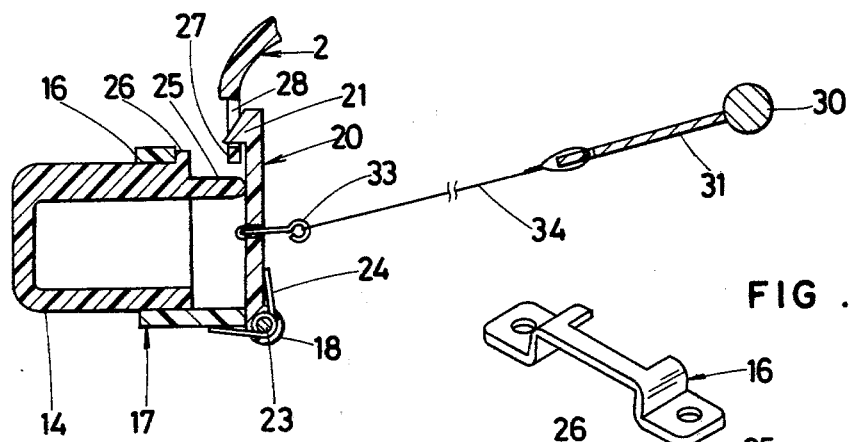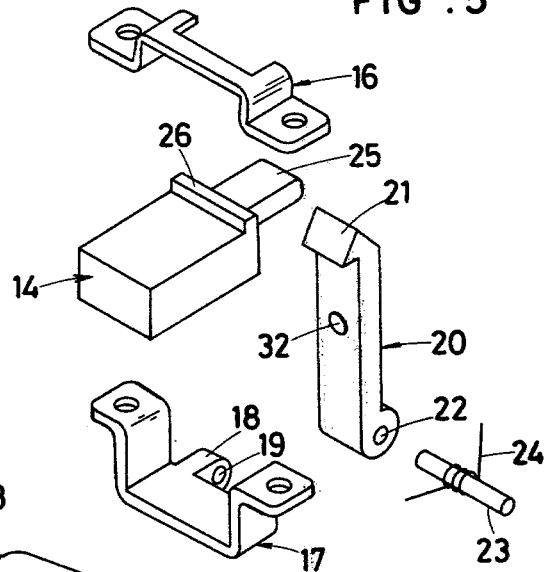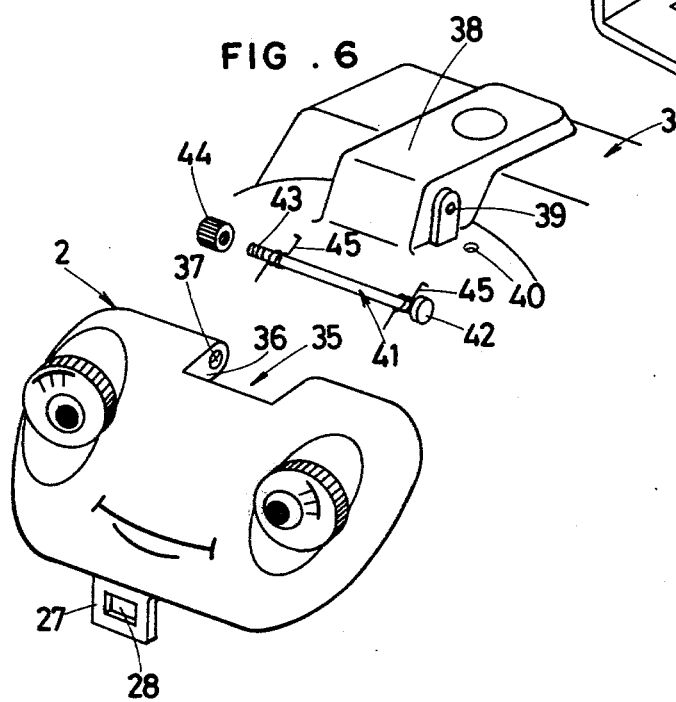

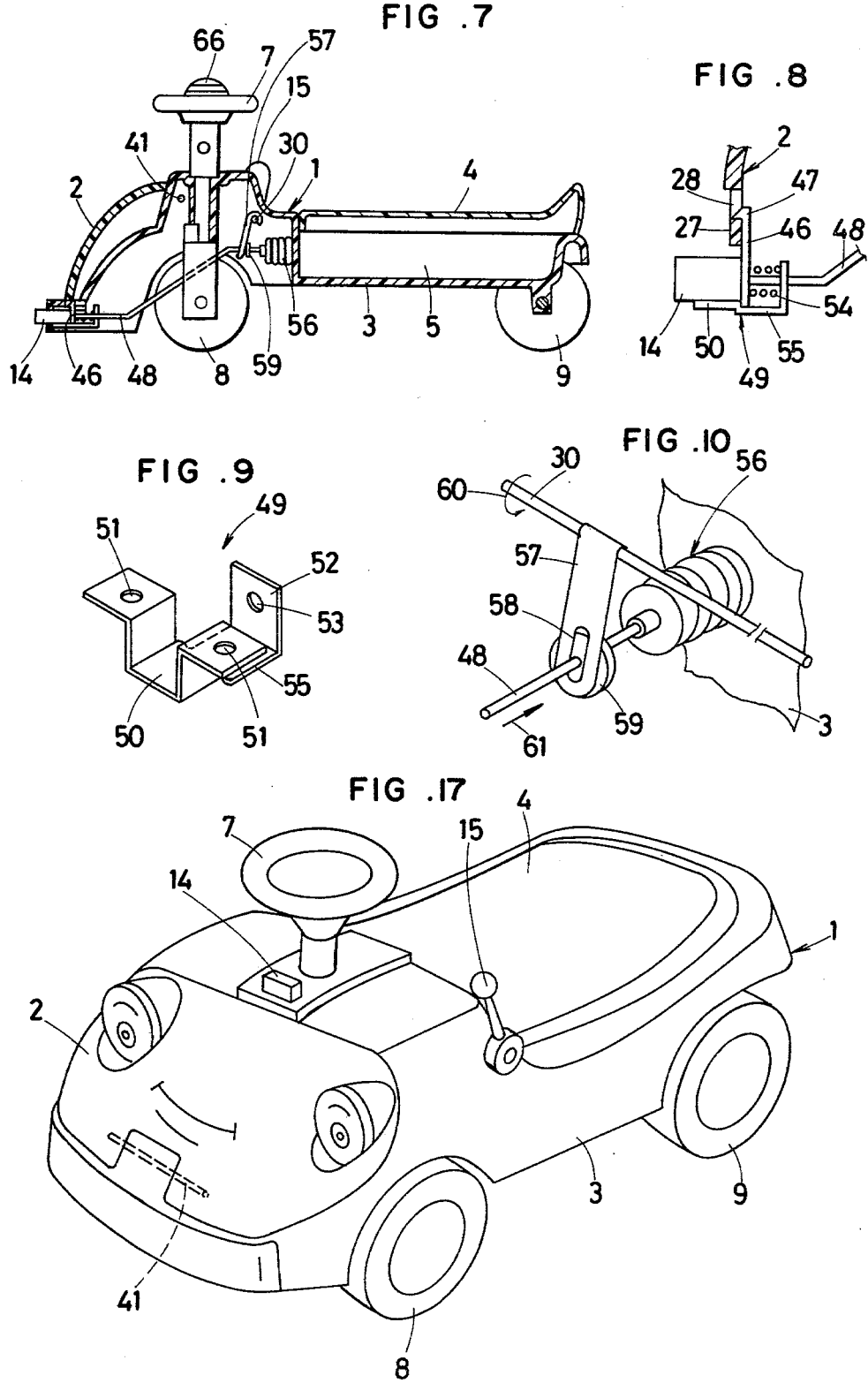

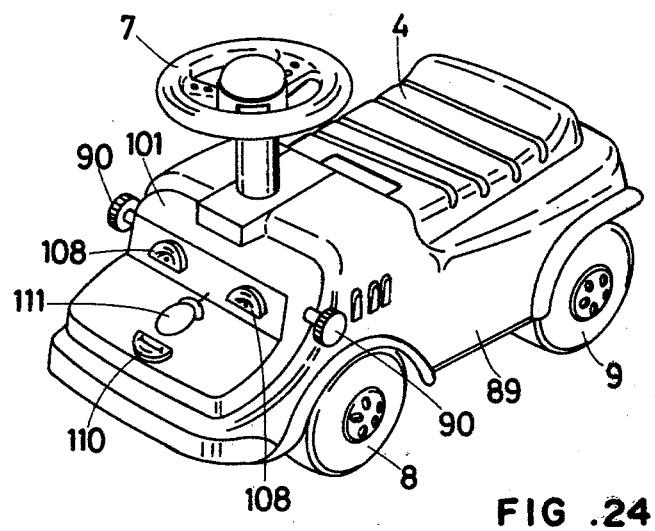
FIG. 22
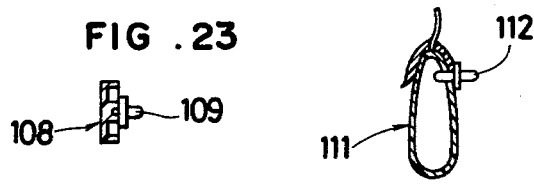
FIG. 23
FIG. 24
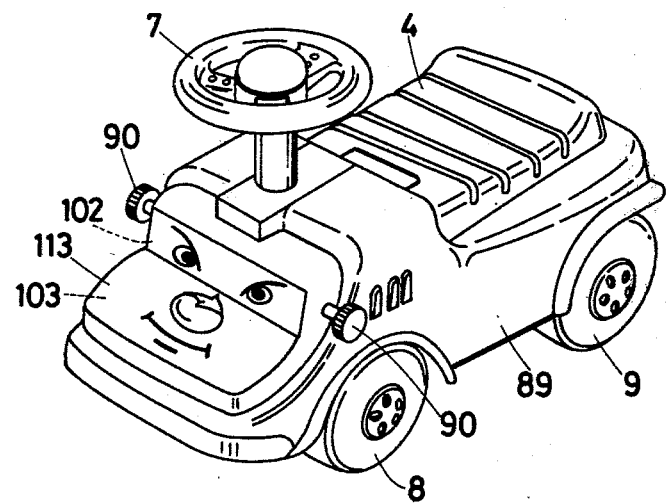
FIG. 25

TOY VEHICLE FOR CHILDREN

BACKGROUND OF THE INVENTION

1. Field of the Invention

The present invention relates to a vehicle for children and particularly to a construction used for vehicles for children improved to arouse the interest of children.

2. Description of the Prior Art

Vehicles for children in various styles simulating automobiles, motorcycles, airplanes, animals and many other forms have appeared on the market. Such a variety of static shapes should not go unheeded from the standpoint of arousing the interest of children. The bodies of such vehicles for children are in most cases made of rigid plastics. Therefore, the vehicle bodies will usually be produced by a molding process using dies.

Such dies are known to be very expensive. Therefore, the diversified small-quantity production of vehicle bodies is not so desirable, involving an increase in cost. However, the market sees the need of a variety of vehicles for children, as described above and, actually, such vehicles are being offered to meet the need.

In designing and producing a variety of vehicles for children, the following should be taken into account. First, the provision of a variety of vehicles for children usually requires a corresponding variety of vehicle bodies. For this reason, the die must be changed each time a different vehicle body is to be produced. This is disadvantageous from the standpoint of cost, as described above. Next, even if vehicles for children are of various shapes, the shape of the respective vehicle bodies is changed only partly. This means, in particular, that if a suitable design is selected at the stage of designing a vehicle body, a change of only a portion may provide a different overall impression, and that the remaining portions can be used in common. When a vehicle for children is viewed as a whole, it is seen that the most important portion that performs the function of changing the impression as a whole is the front housing of the vehicle body. An investigation of vehicles for children on the market will reveal that it is the design of the front housing that determines whether the vehicle looks like an automobile, an airplane, an electric car or an animal. Thus, it is seen that the front housing has a great influence on the design of the vehicle for children as a whole.

Besides varying the static external shape as a means for arousing the interest of children, it is contemplated to give a dynamic external shape.

In other fields than that of ridable toy vehicles to which the present invention is directed, for example, in the field of toy automobiles which children hold with their hands to play with them, there has heretofore been an arrangement wherein the bonnet portion of an automobile is made removable or adapted to be opened and closed, as found in miniature toy cars, so as to arouse the interest of children by this dynamic function. In the field of ridable toys, i.e., vehicles for children, however, there has been no such arrangement wherein the bonnet portion is made removable or adapted to be opened and closed. Such dynamic function, however, is likely to be an important element for arousing the interest of children in the field of vehicles for children.

Further, in vehicles for children, not only the external shape but also accessories attached thereto are an element for arousing the interest of children. Such accessories become more diversified than said external shapes, and it is considered that only those of the accessories that are fantastic or elaborate can attract children. However, considering that the vehicles are for use by children, too complicated an arrangement can hardly be employed.

SUMMARY OF THE INVENTION

The present invention is intended to provide a construction used for vehicles for children which is simple and advantageous as to arousing the interest of children.

In brief, the present invention is a vehicle for children comprising a vehicle body having a seat on its upper surface and a plurality of ground-engaging wheels on its lower surface, wherein a bonnet-like front housing portion forming the front upper surface of said vehicle body and the remainder of the vehicle body excluding said front housing portion are composed of separate members.

In a preferred embodiment, the front housing portion is tiltably attached to the body remainder so that the tilting of the front housing enables the latter to be opened and closed. With this arrangement, when the front housing is in its closed position, the outer surface of the front housing becomes visible, but when it is opened, the portion which was hidden thereunder comes into view. If, therefore, the designs on the outer surface of the front housing and on the outer surface of the remainder of the vehicle body remainder located under the front housing are made different from each other, it is possible to provide a dynamic variation in the external appearance in accordance with the opening and closing of the front housing.

In another preferred embodiment of the invention, the front housing is arranged so that it can be easily removed from the vehicle body remainder. If, therefore, various forms of said front housing are prepared, then by selectively combining these various front housing portions with the rest of the vehicle body remainders it is possible to provide a variety of products at relatively low cost which give different impressions due to their external shapes.

Accordingly, a principal object of the invention is to provide a construction used for vehicles for children which achieves the presentation of an external shape at low cost which arouses the interest of children.

Another object of the invention is to provide a construction used for vehicles for children which is adapted for a diversified small-quantity production of vehicles for children.

In another aspect, the invention provides a vehicle for children which has not only a static external shape arousing the interest of children but also a dynamic function.

In a further aspect, the invention provides a vehicle for children wherein the variations in external appearance caused by a dynamic function are interrelated before and after the change, so that the impression given by such change is interesting.

In another aspect, the invention provides a vehicle for children equipped with accessories sufficiently elaborate to arouse the interest of children.

These and other objects and features of the invention will become more apparent from the following detailed description given with reference to the accompanying drawings.

BRIEF DESCRIPTION OF THE DRAWINGS

FIG. 4 is a diagrammatic sectional view showing an example of engaging means provided for the front housing of FIG. 1;

FIG. 5 is an exploded perspective view of some parts of the engaging means of FIG. 4;

FIG. 6 is a perspective view of the front housing separated from the vehicle body;

FIG. 7 is a sectional view of a vehicle for children illustrating another sample of the engaging means for the front housing of FIG. 1;

FIG. 8 is a diagrammatic side view of the principal portion of the engaging means shown in FIG. 7;

FIG. 9 is a perspective view of a guide shown in FIG. 8;

FIG. 10 is a principal perspective view illustrating a whistling device interlocked to the engaging means of FIG. 7;

FIG. 17 is a perspective view illustrating another example of the manner of supporting and opening and closing the bonnet-like front housing;

FIG. 22 is a perspective view with accessories attached to FIG. 21;

FIGS. 23 and 24 are sectional views of the accessories of FIG. 22; and

FIG. 25 is a perspective view with a sticker applied to FIG. 21.

DESCRIPTION OF THE PREFERRED EMBODIMENTS

Figure 1:
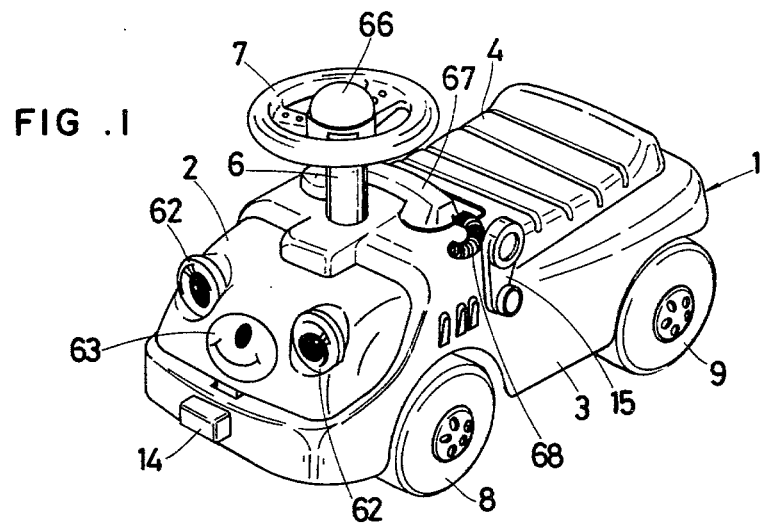
FIG. 1 is a perspective view of an embodiment of the invention.
Figure 2:
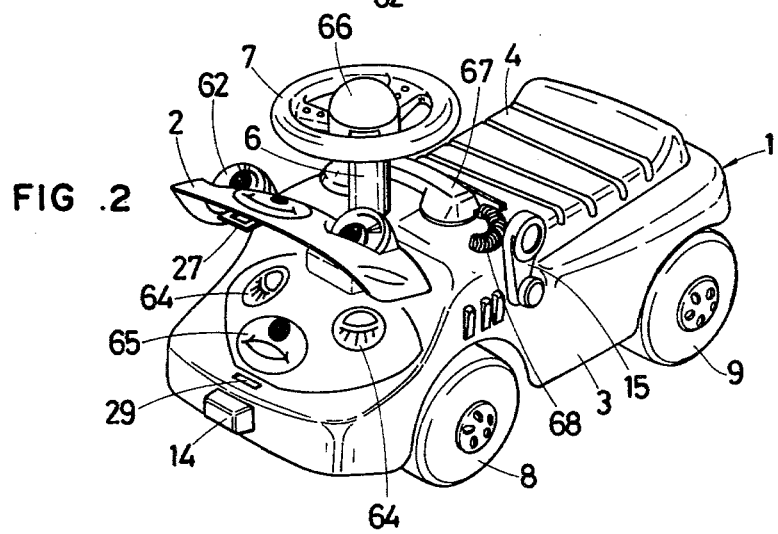
FIG. 2 is a perspective view with a bonnet-like front housing in its opened position.
Figure 3:
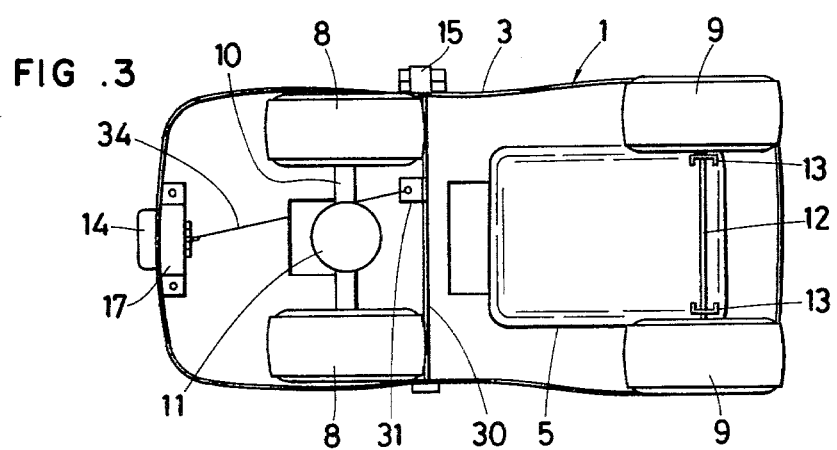
FIG. 3 is a bottom view of FIG. 2.

Referring to FIGS. 1 to 3, the present vehicle for children has a vehicle body 1 made of plastic or the like material. The vehicle body 1 is formed with a bonnet-like front housing 2. The body remainder 3 excluding said front housing 2 is manufactured separately from said front housing 2. A seat 4 is provided on top of the body remainder 3. The seat 4 is adapted to be opened and closed, and a storage portion 5 located below said seat 4 may be arranged to store things. The relatively forward portion of the remainder 3 of the body is provided with a steering wheel 7 supported on an upwardly projecting wheel shaft 6. Rotatably installed below the body remainder 3 are two ground-engaging front wheels 8 and two ground-engaging rear wheels 9.

The front wheels 8 are supported on a front wheel shaft 10 journaled in a bearing portion 11 extending from the steering wheel shaft 6. The portion extending from the bearing portion 11 to the steering wheel shaft 6 is arranged to be rotatable around its axis with respect to the body remainder 3. As a result, the front wheels 8 are turnable by the manipulation of the steering wheel. Besides such arrangement, the front wheels 8 may be fixed, serving for ornamental purposes only. The rear wheels 9 are supported on a rear wheel shaft 12 journaled in bearings 13 extending from the body remainder 3.

The vehicle body 1 is provided with a push button 14 on the front end and an operating lever 15 on one side. The push button 14 and operating lever 15 will be manipulated to open the front housing 2, as shown in FIG. 2. The details of such arrangement will be described below.

Referring to FIGS. 4 and 5, the push button 14 is held between upper and lower attachments 16 and 17 fixed to the inner side of the bumper-like front end portion of the vehicle body 1 and is displaceable back and forth. The lower attachment 17 is formed with a rearwardly projecting pin receiving portion 18 formed with a pin receiving hole 19. A locking lever 20 is provided with a hook 21 at its front end and a pin receiving hole 22 at its bottom. A pin 23 is received in the pin receiving holes 19 and 22 aligned with each other. The locking lever 20 is supported on said pin 23 for rotation with respect to the lower attachment 17. A spring 24 is mounted on the pin 23 with the opposite legs of said spring resiliently abutting against the lower attachment 17 and the locking lever 20, thereby constantly urging said locking lever counterclockwise as viewed in FIG. 4. The counterclockwise urging of the locking lever 20 brings it into abutment against a projection 25 on the push button 14, thereby urging the push button 14 to the left as viewed in FIG. 4. The leftward urging of the push button 14 brings a ridge 26 on the upper surface of the push button into abutment against the upper attachment 16, whereby the push button is arrested. The front end of the front housing is provided with a downwardly extending projection 27 formed with a rectangular engaging hole 28. The front end of the body remainder 3 is provided with an elongated throughgoing hole or a slot 29 (FIG. 2) for receiving the projection 27. When the projection 27 is received in the slot 29, the hook 21 engages one end edge of the throughgoing hole 28 to maintain the closed state of the front housing 2. When the push button 14 is pressed, the locking lever 20 is turned clockwise as viewed in FIG. 4, thus cancelling the engagement between the hook 21 and the end edge of the locking hole 28.

The operating means for effecting said disengagement includes the operating lever 15 and the push button 14. The operating lever 15 is arranged so that it can be turned together with a turning shaft 30 extending widthwise of the body remainder 3 and turnably supported in the opposite side walls of the body remainder 3. The turning shaft 30 has a turning piece 31 fixed thereto, while the locking lever 20 is provided with a throughgoing hole 32 in which a hooking element 33 is received in such a manner that it will not come out. A string or wire 34 extends under tension between the hooking element 33 and the turning piece 31 to connect them together. With this arrangement, when the operating lever 15 is turned in either direction, its movement is transmitted to the locking lever 20 successively through the turning shaft 30, the turning element 31, the string 34 and the hooking element 33, so that the locking element 20 is disengaged from the end edge of the engaging hole 28.

Referring to FIG. 6, the front housing 2 shown therein differs slightly from the front housing 2 shown in FIG. 1. Various further forms for the front housing 2 will be described below with reference to FIG. 16.

The front housing 2 is provided with a notch 35 on the side opposite to the side where the projection 27 is provided, and ribs 36 (one of which is hidden) formed on the opposite sides of the notch 35 are provided with throughgoing holes 37. The body remainder 3 is provided with a ridge 38 adapted to be received in the notch 35 of the front housing 2, said ridge 38 being provided with a bearing hole 39. Small holes 40 are provided in the vicinity of the bearing hole 39 of the body remainder 3.

A shaft member 41 is prepared in order to connect the front housing 2 to the body remainder 3. The shaft member 41 is provided with a head 41 on one end and a male thread 43 on the other end. The male thread 43 will threadedly receive a nut 44, which is, for example, a cap nut. The shaft member 41 has two springs 45 fitted thereon.

The manner of connecting the front housing 2 to the body remainder 3 will now be described. First, the throughgoing holes 37 of the front housing 2 and the bearing hole 39 of the body remainder 3 are brought into alignment with each other. In order to facilitate the insertion of the shaft member 41 to be presently described, it is preferable that such alignment be effected with the front housing 2 opened. The shaft member 41 with one spring 45 carried thereon is inserted into one throughgoing hole 37 and then into the bearing hole 39 until it projects through the other throughgoing hole 37. The other spring 45 is then fitted on the projecting portion, and the nut 44 is engaged with the male thread 43 on the projecting portion, so that the front housing 2 is turnably supported by the shaft member 41 with respect to the body remainder 3. In this state, the springs 45 act to constantly urge the front housing 2 in its opening direction. More particularly, one leg of a spring 45 is inserted in the associated small hole 40 and the other leg is fixed to the front housing 2 at a suitable position thereon. Thus, even if the front housing 2 is joined to the body remainder 3, it is easy to remove it therefrom. More particularly, this can be achieved by loosening the nut 44 to remove it from the shaft member 41 and withdrawing the latter.

As described above, when the front housing 2 is turnably connected to the body remainder 3, it is constantly urged in its opening direction by the action of the springs 43. In the ordinary state, however, it is necessary that it be in its closed position, as shown in FIG. 1. The engaging means described with reference to FIGS. 4 and 5 advantageously acts for this purpose.

The engaging means described with reference to FIGS. 4 and 5 may be replaced by engaging means to be described below. If the following embodiment is used, the addition of this simple arrangement will make it possible to provide an interesting embodiment wherein a whistle can be blown in operative association with the engaging means.

Referring to FIGS. 7 through 10, the engaging means also comprise a push button 14 and an operating lever 15, rotatably supported on a shaft 30, which serve as operating means. The push button 14 has an engaging member 46 fixed thereto. The front end of the engaging member 46 is formed with a hook 47 adapted to engage one end edge of the rectangular locking hole 28 of a projection 27. Further, the push button 14 has a rod 48 connected thereto. Therfore, the movement of the push button involves the movement of the engaging member 46 and the rod 48 as a unit. The engaging member 46 is retained and guided by a guide 49 best shown in FIG. 9. The guide 49 is provided with a guide element 50 of U-shaped cross-section for slidably receiving the push button 14 therein. The guide 49 is also provided with attaching holes 51 for attaching the guide 49 to the lower surface of the body remainder 3. The rod 48 is received in a rod guide hole 53 formed in an upright portion 52. A coil spring 54 is interposed between the upright portion 52 and the engaging member 46, whereby the engaging member 46 is constantly urged to the left as viewed in FIG. 8, i.e., in a direction to force the hook 47 of the engaging member 46 into the engaging hole 28. The engaging member 46 is positioned so that its lower end is in slide contact with a portion 55 located a step below the receiving portion 50, whereby the range of movement of the engaging member 46 is limited by said portion 55.

The rod 48, as shown in FIG. 7, is suitably guided toward the rear while clearing the obstacles inside the body remainder 3 and is connected to a whistling device 56 disposed approximately intermediate between the ends of the vehicle. The whistling device 56 comprises an air chamber made of plastic material and a whistle and is arranged so that the whistle is blown by compressing the air chamber to force out the air therein. The compression of the air chamber is achieved by the displacement of the rod 48.

The displacement of the rod 48 is operatively associated with the manipulation of the push button 14 but said displacement can also be achieved by manipulating the operating lever 15. The operating lever 15 is supported by the turning shaft 30, as previously described. The turning movement of the operating lever 15 causes the turning movement of the shaft 30 around its axis. The shaft 30 has a tongue member 57 fixed thereto. The tongue member 57 is formed with an elongated hole 58 in which a rod 48 is inserted. On the side of the tongue member 57 nearer to the whistling device 56, there is provided a flange 59 fixed to the rod 48. As a result, the turning of the operating lever 15 causes the shaft 30 to turn in the direction of arrow 60, with the tongue member 57 pushing the flange 59, so that the rod 48 together with the flange 59 is displaced in the direction of arrow 61.

In such an arrangement, pressing the push button 14 or turning the operating lever 15 disengages the hook 47 of the engaging member 46 from the locking hole 28, allowing the front housing 2 to automatically open under the action of the springs 45. Particularly, if the arrangement shown in FIGS. 7 through 10 is employed, the manipulation for disengaging the engaging member 46, i.e., the pressing of the push button 14 or the turning of the operating lever 15 is also effective to blow the whistling device 56.

Again referring mainly to FIGS. 1 and 2, the ornamental arrangement affixed to the vehicle for children will now be described.

The front housing 2 presents a human being's facial expression with the eyes opened and the mouth closed, in caricature. The opened eyes are expressed by appropriate headlight portions 62 for this purpose, while the closed mouth is expressed by applying a sticker 63.

The portion hidden by said front housing 2, i.e., the front upper surface of the body remainder 3 presents a human facial expression with the eyes closed and the mouth opened, in caricature. The closed eyes are expressed by applying stickers 64, while the opened mouth is expressed by applying a sticker 65.

By applying said presentations of a caricature resembling a human face, as will be readily understood by reference to FIGS. 1 and 2, the closed position (FIG. 1) and the open position (FIG. 2) of the front housing 2 provide different facial expressions. Since the change from the closed position to the opened position is instantaneously effected by the springs 45 (FIG. 6), it follows that the facial expression with the eyes open and the mouth closed will suddenly change into the facial expression with the eyes closed and the mouth open. This unexpectedness is likely to arouse the interest of a child. The shift of the front housing from its closed position to its opened position can be achieved by manipulating the operating lever 15, as described above. In this connection, attention should be given to the position and state in which the push button 14 is installed. More particularly, the push button 14 is installed, projecting from the front surface of the vehicle body 1. Therefore, when a child is playing with this vehicle by sitting astride on the seat 4 of the vehicle and drives by leg strokes kicking the ground, a collision of the vehicle against some obstacle will result in pressing the push button 14, so that the front housing 2 is opened simultaneously with such collision. Further, if this action of pressing the push button 14 blows the whistle (FIGS. 7 through 10), it is possible to give an impression as if the vehicle were complaining of the pain it suffered from the collision. This feature may give children an impression as if this vehicle were a living creature.

The shift of the front housing 2 from its open position (FIG. 2) to its closed position (FIG. 1) can be achieved by simply depressing the front housing 2. This is so because the hook 21 of the locking lever 20 (FIG. 4) or the hook 47 of the engaging member 46 (FIG. 8) is formed with a guide surface so that the engaged state can be automatically established by the spring 24 or the springs 54. Further, the push button 14 or the operating lever 15 manipulated to open the front housing 2 will automatically return to its original position under the action of the spring 24 (FIG. 4) or the springs 54 (FIG. 8).

Another ornamental arrangement comprises a klaxon accessory 66 disposed at the middle of the steering handle 7. The klaxon accessory 66 works on substantially the same principle as the whistling device 56 previously described and comprises an air chamber and a whistle. Thus, the whistle is blown by manually compressing the air chamber to force out the air therein.

Further, an accessory 67 in the form of a wireless telephone may be attached to an area adjacent the steering wheel 7 through a cord 68. This telephone accessory 67 can be picked up from the vehicle body 1 within the range in which the cord 68 extends.

Vehicles for children shown in FIGS. 11 through 16 are such that the impressions their external shapes give are different from the impression of the external shape of the vehicle shown in FIG. 1. However, even if limited to the cases shown in FIGS. 11 through 16, there are many common parts despite the fact their external shapes give different impressions. For example, the common parts include the body remainder 3, seat 4, steering wheel 7, ground-engaging front wheels 8, ground-engaging rear wheels 9, push button 14 and operating lever 15. Each of the vehicles shown in FIGS. 11 through 16 is adapted to have an upwardly extending handle 69 attached to its rear end of the body remainder 3. Such handle 69 can be attached in the manner shown in FIGS. 11 and 12. The handle 69 is attached by being inserted in holes 70 (FIGS. 13 through 16) formed in the rear end of the body remainder 3. Further, the handle 69 can be easily withdrawn from the holes 70, and therefore, it may be installed only when necessary (FIGS. 11 and 12) and detached when unnecessary (FIGS. 13 through 16). The handle 69 is used when a grown-up pushes the vehicle with a child sitting on the vehicle to amuse the child or when a child pushes the vehicle.

Figure 11:
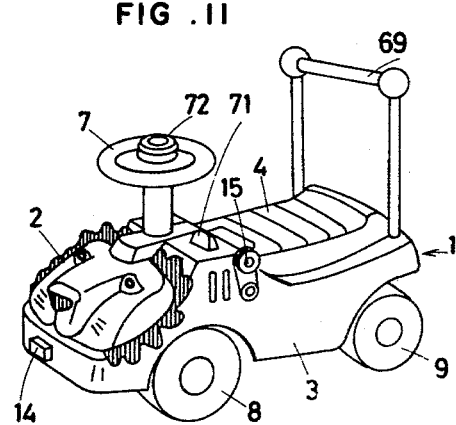
FIGS. 11 through 16 are perspective views showing a plurality of examples which, as compared with the one shown in FIG.1, give different impressions due to their different external shapes.

FIG. 11 shows a vehicle for children simulating a lion. Thus, the front housing 2 has the shape of a lion's face. Ear accessories 71 corresponding to lion's ears are attached, for example, removably. A klaxon accessory 72 is attached to the middle of the steering wheel 7. In addition, such klaxon accessory 72 is also attached to the vehicles for children shown in FIGS. 12 through 14.

Figure 12:
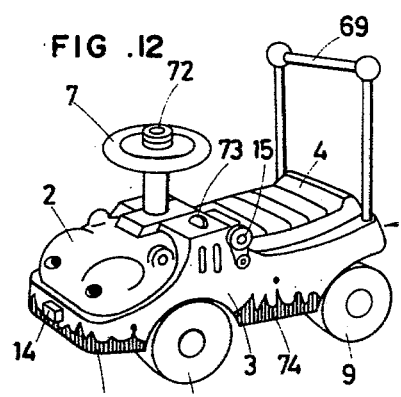

FIG. 12 shows a vehicle for children simulating a hippopotamus. Thus, the front housing 2 has the shape of a hippopotamus's face. As in the case of FIG. 11, ear accessories 73 corresponding to hippopotamus's ears are removably attached. Further, stickers 74 representing a water surface are applied. Such watersurface stickers 74 can be easily affixed after the production of the body remainder 3.

Figure 13:
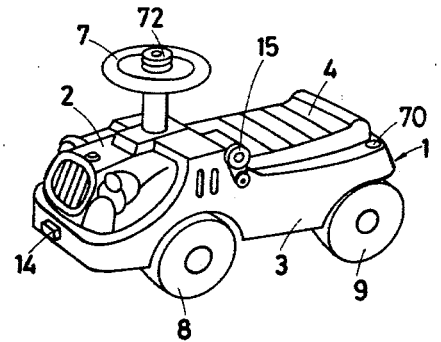

FIG. 13 shows a vehicle for children simulating a classic car. Thus, the front housing 2 is in the form of the bonnet of a classic car.

Figure 14:
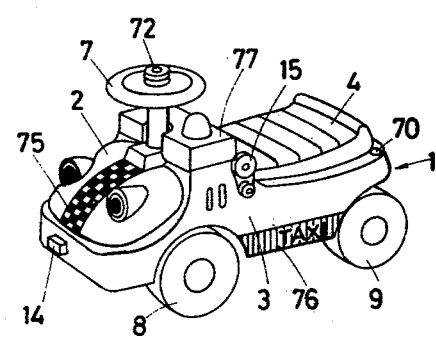

FIG. 14 shows a vehicle for children simulating a taxi. In order to make the vehicle look more like a taxi. A checkered sticker 75 is applied to the front housing 2 and a sticker 76 bearing the letters "TAXI" is applied to a side of the body remainder 3. Further, an accessory 77 simulating a taximeter or the like is attached to an area adjacent and below the steering wheel 7.

Figure 15:
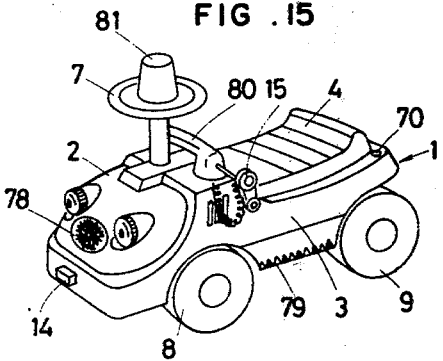

FIG. 15 shows a vehicle for children simulating a patrol car. Thus, the front housing 2 has the shape of the bonnet of an automobile. In order to make the vehicle look more like a patrol car, a sticker 78 representing a police emblem is applied to the front housing 2 and a sticker 79 is applied to a side of the body remainder 3. For example, the sticker 79 may bear the letters "HIGHWAY PATROL". Further, an accessory 80 in the form of a wireless telephone is attached to the vehicle. An accessory 81 simulating a flasher peculiar to an emergency car is attached to the middle of the steering wheel 7.

Figure 16:
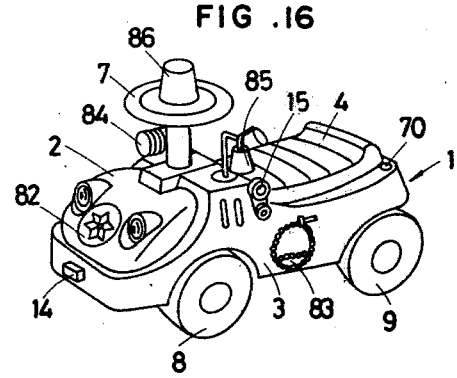

FIG. 16 shows a vehicle for children simulating a fire engine truck. Thus, the front housing 2 has the shape of the bonnet of a fire engine truck. In order to make the vehicle look more like a fire engine truck, a sticker representing a fire-fighting emblem is applied to the front housing 2 and a sticker 82 representing a fire-fighting hose and bearing the letters "FIRE ENGINE TRUCK" (not shown) is applied to a side of the body remainder 3. Further, an accessory 84 simulating a siren and an accessory 85 simulating a bell are attached to the sides of the body remainder 3. An accessory 86 simulating a flasher is attached to the middle of the steering wheel 7, as in the case of a patrol car.

It will be understood that in the vehicles for children shown in FIGS. 11 through 16, by having the body remainder 3 in common and changing the front housing as desired, it is possible to provide a variety of products. Instead of the examples shown in FIGS. 11 through 16, the front housing 2 may be made to represent other different types. For example it may have the shape of the front of an airplane, a locomotive or a streetcar.

In the embodiments described above with reference to FIGS. 1 through 16, the front housing 2 is turnably supported on the shaft member 41 located in a relatively rearward area. Therefore, when the front of the vehicle is observed, the portion hidden under the front housing 2 comes into view the instant the front housing 2 is opened. If a form related to the external form of the front housing or an unexpectable form having nothing to do therewith is applied to the hidden portion in advance, it is possible to provide an interesting vehicle for children. As for the form applied to the hidden portion, besides the one shown in FIG. 2, in the case of the front housing 2 having the shape of the face of an animal shown in FIG. 11 or 12, the condition of the interior of the animal's mouth showing the fangs or a different facial expression may be represented by a sticker or the like. Further, in the case of vehicles for children simulating automobiles as in FIGS. 13 through 16, a caricaturized engine with an angry face or a crying face may be represented by a sticker or the like. Such expedients are likely to further arouse the interest of children.

The manner of turning the front housing 2 may be modified in various ways. For example, an arrangement shown in FIG. 17 may be adopted. Thus, the front housing 2 of a vehicle for children shown therein is turnably supported on a shaft member 41 (shown in dotted lines) located in a relatively lower position. Accordingly, the push button 14 and the associated engaging means (not shown) are disposed relatively rearwardly on the front housing 2. In addition, in FIG. 17, the parts corresponding to those shown in the figures described above are given like reference numerals, and a description thereof is omitted.

As for the manner of tiltably supporting the front housing, an arrangement may be adopted wherein it is supported on a laterally positioned shaft so that it may be laterally opened. As another arrangement, the front housing 2 may be divided into two parts in the manner of a double-leafed hinged door.

Further, the front housing 2 may be combined with the body remainder by fitting them together using suitable locking means, rather than tiltably supporting it as described above. An example of such arrangement will now be described with reference to FIGS. 18 through 24.

Figure 18:
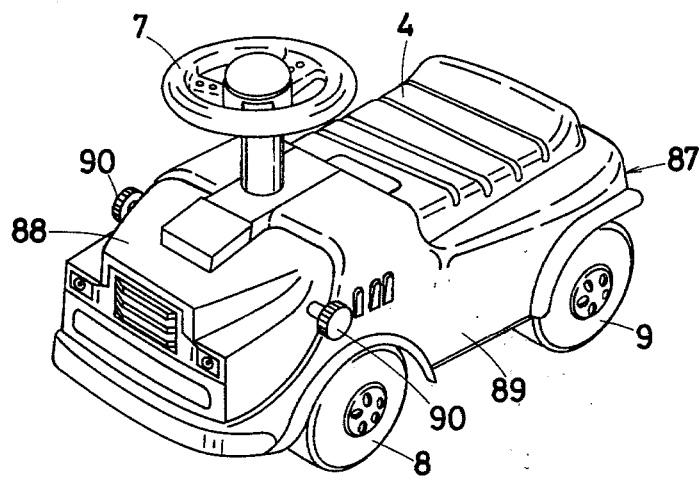
FIG. 18 is a perspective view of another embodiment of the invention.
Figure 19:
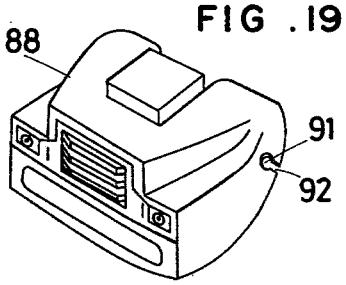
FIG. 19 is a perspective view showing the bonnet-like front housing itself.
Figure 20:
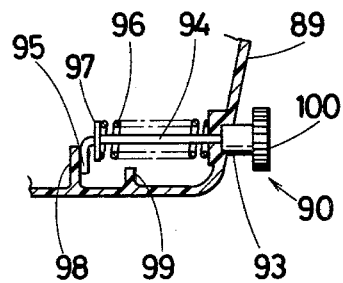
FIG. 20 is a sectional view showing a portion of the vehicle body of FIG. 18.

FIGS. 18 through 24 show a vehicle for children similar to the one shown in FIG. 1. Thus, the seat 4, steering wheel 7, front wheels 8, rear wheels 9, etc., are substantially the same as those shown in FIG. 1. The vehicle for children shown therein simulates a truck. Thus, the vehicle body 87 has a shape looking like a truck. However, only the bonnet-like front housing 88 is constructed to simulate the front of a truck, but the body remainder 89 basically resembles the body remainder 3 of FIG. 1. The front housing 89 is combined with the body remainder 89 by fitting them together, and such combined state is selectively fixed by attachments 90. Therefore, the front housing 88 can be separated from the body remainder 89, as shown in FIG. 19. The front housing 88 has an internal shape which is complementary to the external shape (best shown in FIG. 21) of the associated portion of the body remainder 89, so that is can be advantageously positioned on the associated portion of the body remainder 89. In order to fix this positioned state, an arrangement shown in FIGS. 19 and 20 is used.

Referring to FIG. 19, the front housing 88 is provided with attaching holes 91 disposed on opposite sides adjacent the end edges thereof. Notches 92 extend from said attaching holes to the end edge of the front housing 88.

Referring to FIG. 20, the details of each attachment 90 are shown in an enlarged view. The attachment 90 has an attaching shaft 93 with a diameter equal to or slightly smaller than the diameter of said attaching holes 91. The attaching shaft 93 is supported by an end of a support shaft 94 smaller in diameter than said attaching shaft 93. The support shaft 94 removably extends through the wall of the body remainder 89. The inner end of the support shaft 94 is formed with a bend 95. A coil spring 96 is mounted on the support shaft 94 to exert a resilient force between the inner wall of the body remainder 89 and a flange 97 fixed to the support shaft 94. The resilient force of the coil spring 96 brings the bend 95 into abutment against a locking projection 98 on the inner wall of the body remainder 89. A second locking projection is disposed adjacent said locking projection 98. The second locking projection 99 is shorter than the locking projection 98. When a knob 93 associated with the attaching shaft 93 is pulled, the attaching shaft 93 and support shaft 94 will be displaced against the force of the coil spring 96. In order to temporarily retain an intermediate state of such displacement, the engagement between the second locking projection 99 and the bend 95 is used. More particularly, the engagement between the second locking projection 99 and the bend 95 can be effected by bringing the bend 95 from the state of FIG. 20 with a slight turn applied thereto through the knob 100 to a state in which it has passed over the second locking projection 99 and then releasing the knob 100 while turning it back.

Figure 21:
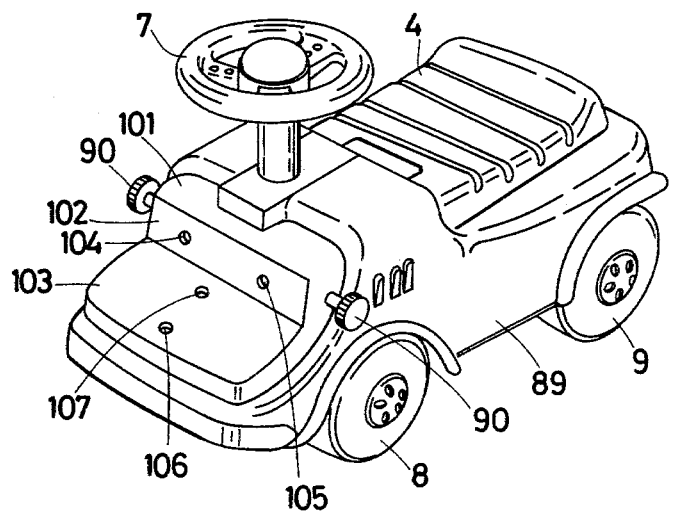
FIG. 21 is a perspective view with the bonnet-like front housing of FIG. 18 removed.

Referring to FIG. 21, the front of the body remainder 89 is formed with a surface 101 for mounting the rear end of the front housing 88. A vertical flat surface 102 and a horizontal flat surface 103 are disposed forwardly of said surface 101. The vertical flat surface 103 is formed with two throughgoing holes 104 and 105 disposed side by side, while the horizontal flat surface 103 is formed with two throughgoing holes 106 and 107 disposed one behind the other.

Referring to FIGS. 22 to 24 along with FIG. 21, accessories 108 simulating stylized human eyes are attached to the throughgoing holes 104 and 105. Such accessory 108 is provided with a pin 109, as shown in FIG. 23, adapted to be tightly inserted into the throughgoing hole 104 or 105, so that the accessories 108 can be removably attached. Further, an accessory 110 simulating a human being's mouth in disfiguration is attached to the throughgoing hole 106. This accessory 110 is substantially the same in shape and other respects as said accessories 108. Further, an accessory 111 simulating a stylized human nose is attached to the throughgoing hole 107. This nose accessory 111 is supposed to represent an eggplant. As shown in FIG. 24, the accessory 111 has a pin 112, whereby it can be removably attached as in the accessories 108.

The way of using or playing with the embodiment shown in FIGS. 18 through 24 will now be described.

First, in the state of FIG. 21 in which the front housing 88 is removed, the accessories 101, 110 and 111 are attached to the respective throughgoing holes 104 through 107. This state is shown in FIG. 22.

Next, the front housing 88 is mounted on the front of the body remainder 89. The mounting of the front housing 88 is effected by holding the knobs 100 on the attachments 90, turning them, e.g., clockwise while withdrawing them to some extent, turning them counterclockwise and removing the hands from the knobs 100, with the result that the bend 95 of FIG. 20 engages the second locking projection 99. In this state, the support shafts 99 are retained partly projecting out through the wall of the body remainder 89. With this state maintained, the front housing 88 is placed on the mounting surface 101 of the body remainder 89 while receiving the support shafts 94 through the notches 92, with the result that the support shafts 94 are placed in the attaching holes 91. When the knobs 100 of the attachments 90 are turned in either direction, the bends 95 are disengaged from the second locking projections 99, so that the support shafts 94 are pushed in by the springs 96 and the attaching shafts 93 are tightly fitted in the attaching holes 91. In this manner, the front housing 88 is mounted, as shown in FIG. 18.

With the form shown in FIG. 18, children may amuse themselves thinking that it is an ordinary vehicle like a truck. If the front housing 88 is removed, as described, then the caricaturized human face can be seen on the front of the body remainder 89, as shown in FIG. 22. In the state of FIG. 22, by suitably changing the accessories 108, 110 and 111, it is possible to produce a different form of presentation, a fact which has the effect or further arousing the interest of children.

While the accessories 108, 110 and 111 shown in FIGS. 22 through 24 have been produced in three dimensions, it is also possible to realize other presentation by applying planar stickers. FIG. 25 shows an arrangement wherein a presentation is realized by applying a sticker 113 having drawn thereon two eyes, a mouth and a nose which simulates a tomato.

Further, in order to achieve various forms of presentation, stickers and three dimensional accessories may be used in combination. It is also possible to use toy shovels, toy cranes, toy lifts and the like as accessories corresponding to those described above.

As illustrated in the various embodiments described above, it will be understood that the manner of presentation on the front housing and the portion hidden by said front housing may be modified in various ways.

Further, in the various embodiments described so far, the front housing has been designed so that it can be easily attached to and detached from the body remainder. This means that the front housing can be easily exchanged, e.g., at a store. If, therefore, various front housings (differing in shape or color) are in stock at a store, it is possible to allow children to select what they like, which is desirable.

While the removable construction of the front housing provides the merits described above, if such merits are not desired, the front housing may be fixedly attached to the body remainder as by an adhesive, bolting or welding.

As described above, according to the present invention, the vehicle body is separated into the front housing and the body remainder excluding the front housing at least in the step of production. If, therefore, various forms of front housing are prepared while using body remainderes in common, a variety of vehicles for children will be readily obtained. If front housings different in color as well as in shape are prepared, two-color vehicles for children will be obtained. In the case of two colors, painting may be contemplated, but in that case there is a danger of the paint coming off. However, the coloration using two colors according to the invention is achieved by coloring resins themselves, so that there is no danger of paint coming off. Further, when consideration is given to the size of the front housing and of the body remainder, it is seen that the body remainder is much larger than the front housing. The cost of the die for the body remainder, which is larger, is high. According to the invention, the expensive die for the body remainder can be used in common, while the dies for the front housings which are required to have many different shapes, can be obtained at relatively low cost, so that diversified small quantities of vehicles for children can be produced efficiently.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A toy vehicle comprising: a vehicle body, a seat provided on the upper surface of said vehicle body, a plurality of ground-engaging wheels rotatably attached to the lower surface of said vehicle body, said vehicle body including a body remainder housing portion and a separate front housing portion forming the upper front surface of the vehicle body, shaft-receiving holes in said separate housing portions aligned with each other to extend through said front housing portion and through said body remainder portion, a shaft member adapted to be received in said shaft-receiving holes, whereby said front housing portion is tiltably attached to said body remainder portion, spring means operatively interposed between said separate housing portions to constantly urge said front housing portion into an open position, latch means operatively supported by said remainder housing portion and adapted for engaging said separate front housing portion to normally prevent the front housing portion from being opened by said spring means, operating means operatively connected to said latch means for unlatching said latch means, first image means applied to said separate front housing portion and second image means applied to said remainder housing portion below said separate front housing portion, whereby actuation of said latch operating means exposes said second image means by the resulting opening of said front housing portion.

2. The toy vehicle of claim 1, wherein said first image means and said second image means are coordinated or related to each other to expose different expressions of a single basic image.

3. The toy vehicle of claim 1, wherein said first image means and said second image means are unrelated to each other.

4. The toy vehicle of claim 1, wherein said shaft member is constructed so that even after the shaft member has been mounted it can be withdrawn, whereby the withdrawal of said shaft member enables said front housing portion to be separated from the body remainder housing portion.

5. The toy vehicle of claim 1, wherein said shaft member is constructed so that after being mounted it cannot be withdrawn.

6. The toy vehicle of claim 1, wherein said operating means for said latch means comprise a push button.

7. The toy vehicle of claim 1, wherein said operating means for said latch means comprise a lever.

8. The toy vehicle of claim 1, wherein said operating means for said latch means comprises a push button and a lever which are disposed on the vehicle at different positions relative to each other.

9. The toy vehicle of claim 1, further comprising bellows means operatively arranged to be compressed in response to the manipulation of said latch operating means, and a whistle arranged to be blown by the air being forced out of said bellows means.

10. The toy vehicle of claim 1, wherein said shaft member is disposed in a relatively rearward area of said front housing portion and extends in the direction of the width of the vehicle.

11. The toy vehicle of claim 1, wherein said shaft member is disposed in a relatively forward area of said front housing portion and extends in the direction of the width of the vehicle.

12. The toy vehicle of claim 1, wherein said first and second image means simulate different facial expressions of an animal.

13. The toy vehicle of claim 1, wherein said first and second image means are facial expressions with the eyes opened and closed, respectively.

14. The toy vehicle of claim 1, wherein said image means comprise three-dimensionally formed accessories on said vehicle body portions.

15. The toy vehicle of claim 1, wherein said image means comprise stickers.

16. The toy vehicle of claim 1, wherein a plurality of types of said separate front housing portion are prepared for exchange one for another and any one of them is selectively combined with said body remainder to constitute said vehicle body.

17. The toy vehicle of claim 1, wherein said separate front body portion and said body remainder housing portion are made of rigid plastic material.

* * * * *